United States Patent
Basso et al.

(10) Patent No.: US 9,692,706 B2
(45) Date of Patent: Jun. 27, 2017

(54) VIRTUAL ENHANCED TRANSMISSION SELECTION (VETS) FOR LOSSLESS ETHERNET

(71) Applicant: International Business Machines Corporation, Armonk, NY (US)

(72) Inventors: Claude Basso, Nice (FR); Robert Birke, Kilchberg (CH); Daniel Crisan, Zug (CH); Casimer M. DeCusatis, Poughkeepsie, NY (US); Mircea Gusat, Langnau (CH); Keshav G. Kamble, Fremont, CA (US); Cyriel J. Minkenberg, Gutenswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 740 days.

(21) Appl. No.: 13/863,275

(22) Filed: Apr. 15, 2013

(65) Prior Publication Data
US 2014/0307554 A1    Oct. 16, 2014

(51) Int. Cl.
*H04L 12/851* (2013.01)
*H04L 12/931* (2013.01)

(52) U.S. Cl.
CPC ........ *H04L 47/2441* (2013.01); *H04L 49/351* (2013.01); *H04L 49/70* (2013.01)

(58) Field of Classification Search
CPC ......... H04L 47/10; H04L 47/35; H04L 47/30; H04L 47/32
See application file for complete search history.

(56) References Cited

U.S. PATENT DOCUMENTS

| | | |
|---|---|---|
| 5,818,818 A | 10/1998 | Soumiya et al. |
| 7,080,378 B1 | 7/2006 | Noland et al. |
| 8,027,354 B1 | 9/2011 | Portolani et al. |
| 8,201,167 B2 | 6/2012 | Anderson et al. |
| 8,364,802 B1 | 1/2013 | Keagy et al. |
| 2003/0081547 A1* | 5/2003 | Ho ............... H04L 12/5695 370/229 |

(Continued)

FOREIGN PATENT DOCUMENTS

| | | |
|---|---|---|
| CN | 1650668 A | 8/2005 |
| CN | 1851652 A | 10/2006 |
| CN | 102821038 A | 12/2012 |

OTHER PUBLICATIONS

Office Action from Chinese Application No. 201410149108.7, dated Oct. 24, 2016.

*Primary Examiner* — Anez Ebrahim
*Assistant Examiner* — Prenell Jones
(74) *Attorney, Agent, or Firm* — Zilka-Kotab, P.C.

(57) ABSTRACT

In one embodiment, a system includes a hardware processor and logic integrated with and/or executable by the processor, the logic being adapted to receive a traffic flow having a plurality of packets, classify the traffic flow into a traffic class based on a characteristic of the traffic flow, the traffic class being selected from a plurality of traffic classes, store an identifier of the selected traffic class to one or more of the packets, and transmit the traffic flow according to its destination based on a priority of its selected traffic class. In more embodiments, additional systems, methods, and computer program products for prioritizing traffic flow handling are described.

22 Claims, 6 Drawing Sheets

(56) References Cited

U.S. PATENT DOCUMENTS

| | | | |
|---|---|---|---|
| 2003/0133443 A1* | 7/2003 | Klinker | H04L 12/2602 370/353 |
| 2004/0205752 A1* | 10/2004 | Chou | H04L 12/5693 718/100 |
| 2005/0114541 A1* | 5/2005 | Ghetie | H04L 47/10 709/232 |
| 2006/0034219 A1* | 2/2006 | Gu | H04L 12/5695 370/329 |
| 2007/0104210 A1 | 5/2007 | Wu et al. | |
| 2008/0089237 A1* | 4/2008 | Molen | H04L 47/2433 370/252 |
| 2010/0046454 A1* | 2/2010 | Wentink | H04W 74/0816 370/329 |
| 2010/0217868 A1 | 8/2010 | Heller, Jr. | |
| 2011/0090910 A1 | 4/2011 | Tripathi et al. | |
| 2011/0225591 A1* | 9/2011 | Wada | G06F 9/45533 718/103 |
| 2011/0242966 A1* | 10/2011 | Van Caenegem | 370/216 |
| 2011/0270987 A1* | 11/2011 | Schlansker et al. | 709/226 |
| 2011/0299391 A1* | 12/2011 | Vobbilisetty | H04L 45/586 370/230.1 |
| 2011/0321039 A1 | 12/2011 | De Leon, III et al. | |
| 2013/0121164 A1* | 5/2013 | Shabtay | H04L 12/4641 370/241.1 |
| 2013/0163611 A1* | 6/2013 | Armstrong | H04L 47/78 370/437 |
| 2013/0170501 A1* | 7/2013 | Egi | H04L 45/60 370/401 |
| 2013/0346583 A1* | 12/2013 | Low et al. | 709/223 |
| 2014/0050218 A1* | 2/2014 | Kamble | G06F 13/385 370/392 |
| 2014/0169169 A1* | 6/2014 | Almog et al. | 370/235 |
| 2014/0201733 A1* | 7/2014 | Benny | G06F 9/455 718/1 |
| 2014/0269274 A1* | 9/2014 | Banavalikar et al. | 370/230 |
| 2014/0310354 A1* | 10/2014 | Fountain et al. | 709/204 |
| 2015/0178805 A1* | 6/2015 | Curry, Jr. | G06Q 30/08 705/26.41 |
| 2015/0372738 A1* | 12/2015 | Negus | H04W 4/00 370/338 |

\* cited by examiner

VIRTUAL ENHANCED TRANSMISSION SELECTION (VETS) FOR LOSSLESS ETHERNET

BACKGROUND

The present invention relates to data center management and file systems, and more specifically, this invention relates to using virtual Enhanced Transmission Selection (vETS) for lossless Ethernet.

Currently available virtual Ethernet switches, which are implementations of full Layer-2/Layer-3 Ethernet switches in software, also known as soft switches or hypervisor switches) do not support the ability to schedule packet transmission according to a priority of the packet or traffic flow (also known as priority scheduling) and the selection of how to utilize the available throughput of the devices in the network (also known as bandwidth allocation).

Physical networking switches (as opposed to virtual switches) offer this functionality through the Enhanced Transmission Selection (ETS) portion of the Institute of Electrical and Electronics Engineers standard (IEEE 802.1 Qaz). Virtual switches normally treat all network traffic in a similar or the same manner, and as a result different virtual networks do not recognize traffic priorities (or worse, different virtual networks may have conflicting priorities overlaying the same physical network). Accordingly, it would be beneficial to implement the analogous function on virtual switches; however, there are problems associated with implementing priority scheduling and bandwidth allocation in virtual switches.

BRIEF SUMMARY

In one embodiment, a system includes a hardware processor and logic integrated with and/or executable by the processor, the logic being adapted to receive a traffic flow having a plurality of packets, classify the traffic flow into a traffic class based on a characteristic of the traffic flow, the traffic class being selected from a plurality of traffic classes, store an identifier of the selected traffic class to one or more of the packets, and transmit the traffic flow according to its destination based on a priority of its selected traffic class.

In another embodiment, a computer program product for prioritizing traffic flow handling includes a computer readable storage medium having program code embodied therewith, the program code readable/executable by a processor to receive, using the processor, a traffic flow having a plurality of packets, classify the traffic flow into a traffic class based on a characteristic of the traffic flow, the traffic class being selected from a plurality of traffic classes, store an identifier of the selected traffic class to one or more of the packets, and transmit the traffic flow according to its destination based on a priority of its selected traffic class.

In accordance with another embodiment, a method for prioritizing traffic flow handling includes receiving a traffic flow having a plurality of packets using one or more virtual ports of a virtual switch (vSwitch), classifying the traffic flow into a traffic class based on a characteristic of the traffic flow, the traffic class being selected from a plurality of traffic classes, wherein the characteristic includes a priority of the traffic flow, and wherein the priority of the traffic flow is used to select a traffic class for the traffic flow, determining an amount of bandwidth which is available to transmit the traffic flow based on a priority of its selected traffic class, with traffic flows from a traffic class having a higher priority being allocated proportionally more bandwidth than traffic flows from a traffic class having a lower priority, allocating computing time slices of a processor to each of the plurality of traffic classes according to a priority of the traffic class, storing an identifier of the selected traffic class to one or more of the packets in a virtual local area network (VLAN) identifier in a three bit priority code point (PCP) field in a VLAN tag portion of a header of the one or more packets, and transmitting the traffic flow according to its destination based on the priority of its selected traffic class.

Other aspects and embodiments of the present invention will become apparent from the following detailed description, which, when taken in conjunction with the drawings, illustrate by way of example the principles of the invention.

DETAILED DESCRIPTION

Figure 1:
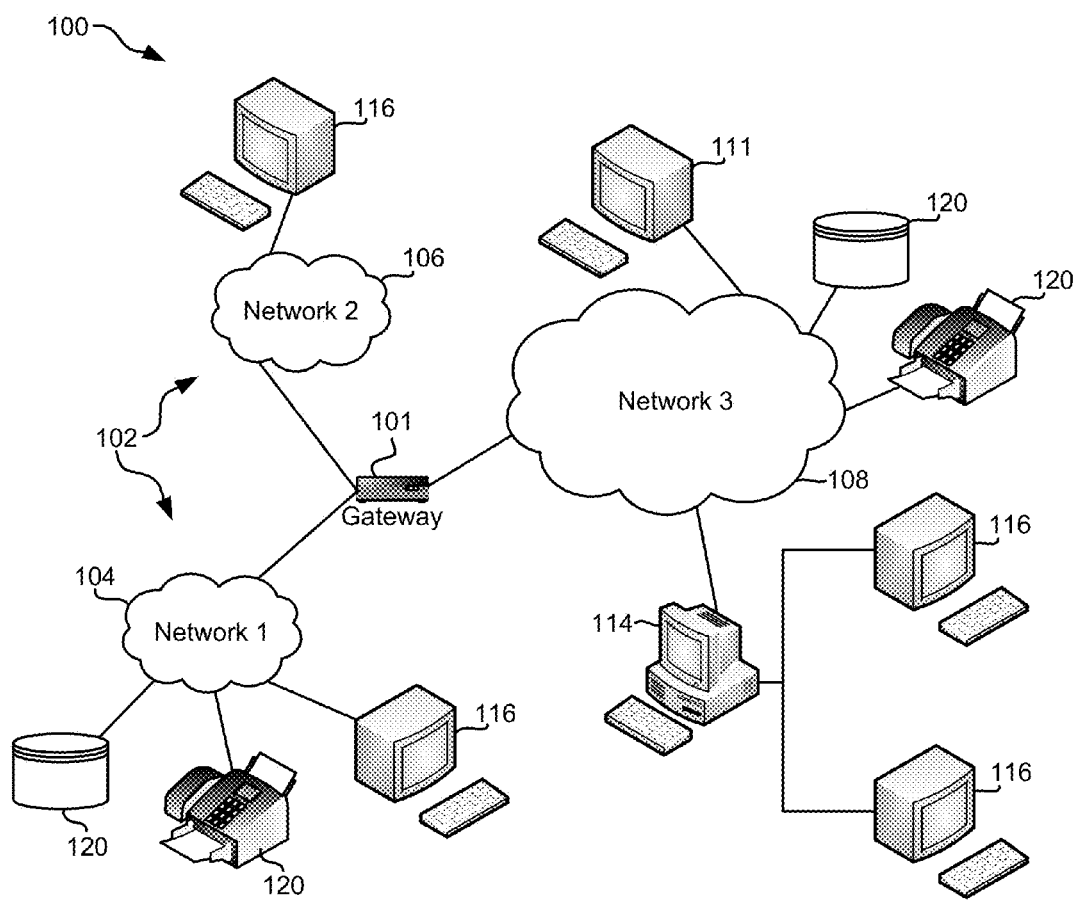
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for implementing priority scheduling and bandwidth allocation on a virtual Ethernet switch hosted by a server.

In one general embodiment, a system includes a hardware processor and logic integrated with and/or executable by the processor, the logic being adapted to receive a traffic flow having a plurality of packets, classify the traffic flow into a traffic class based on a characteristic of the traffic flow, the traffic class being selected from a plurality of traffic classes, store an identifier of the selected traffic class to one or more of the packets, and transmit the traffic flow according to its destination based on a priority of its selected traffic class.

In another general embodiment, a computer program product for prioritizing traffic flow handling includes a computer readable storage medium having program code embodied therewith, the program code readable/executable by a processor to receive, using the processor, a traffic flow having a plurality of packets, classify the traffic flow into a traffic class based on a characteristic of the traffic flow, the traffic class being selected from a plurality of traffic classes, store an identifier of the selected traffic class to one or more of the packets, and transmit the traffic flow according to its destination based on a priority of its selected traffic class.

In accordance with another general embodiment, a method for prioritizing traffic flow handling includes receiving a traffic flow having a plurality of packets using one or more virtual ports of a virtual switch (vSwitch), classifying the traffic flow into a traffic class based on a characteristic of the traffic flow, the traffic class being selected from a plurality of traffic classes, wherein the characteristic includes a priority of the traffic flow, and wherein the priority of the traffic flow is used to select a traffic class for the traffic flow, determining an amount of bandwidth which is available to transmit the traffic flow based on a priority of its selected traffic class, with traffic flows from a traffic class having a higher priority being allocated proportionally more bandwidth than traffic flows from a traffic class having a lower priority, allocating computing time slices of a processor to each of the plurality of traffic classes according to a priority of the traffic class, storing an identifier of the selected traffic class to one or more of the packets in a virtual local area network (VLAN) identifier in a three bit priority code point (PCP) field in a VLAN tag portion of a header of the one or more packets, and transmitting the traffic flow according to its destination based on the priority of its selected traffic class.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing time slices, processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
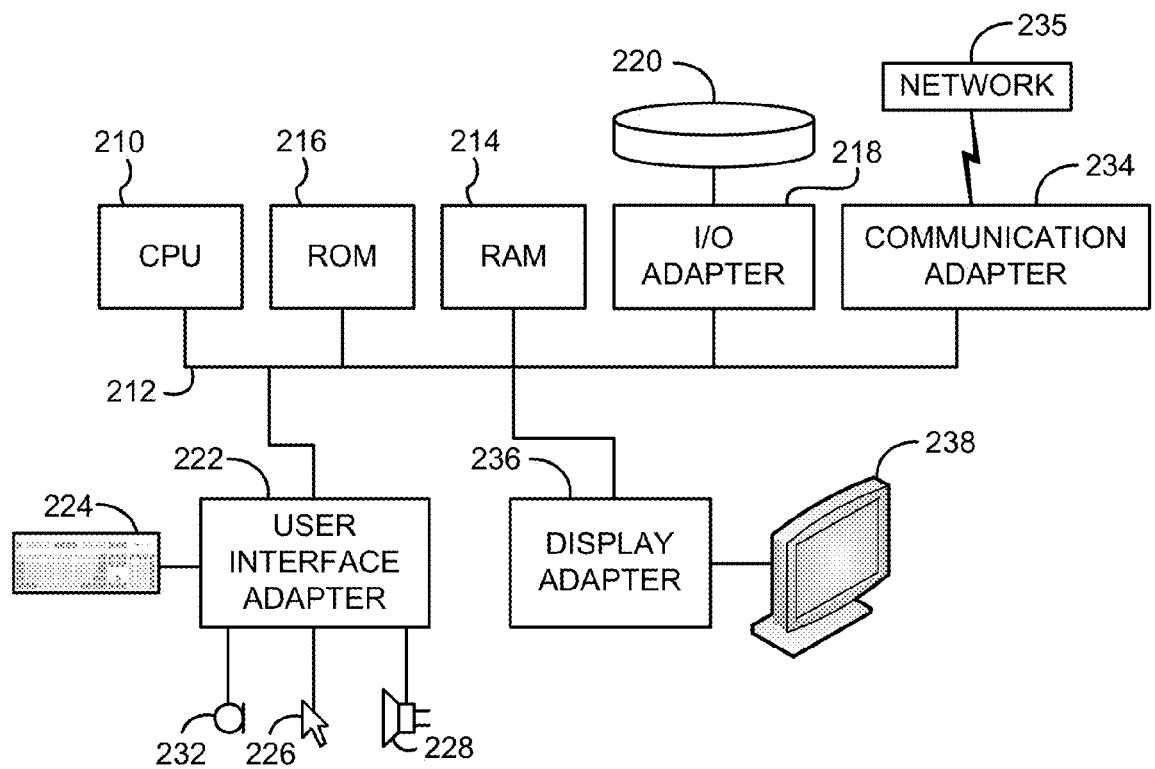
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
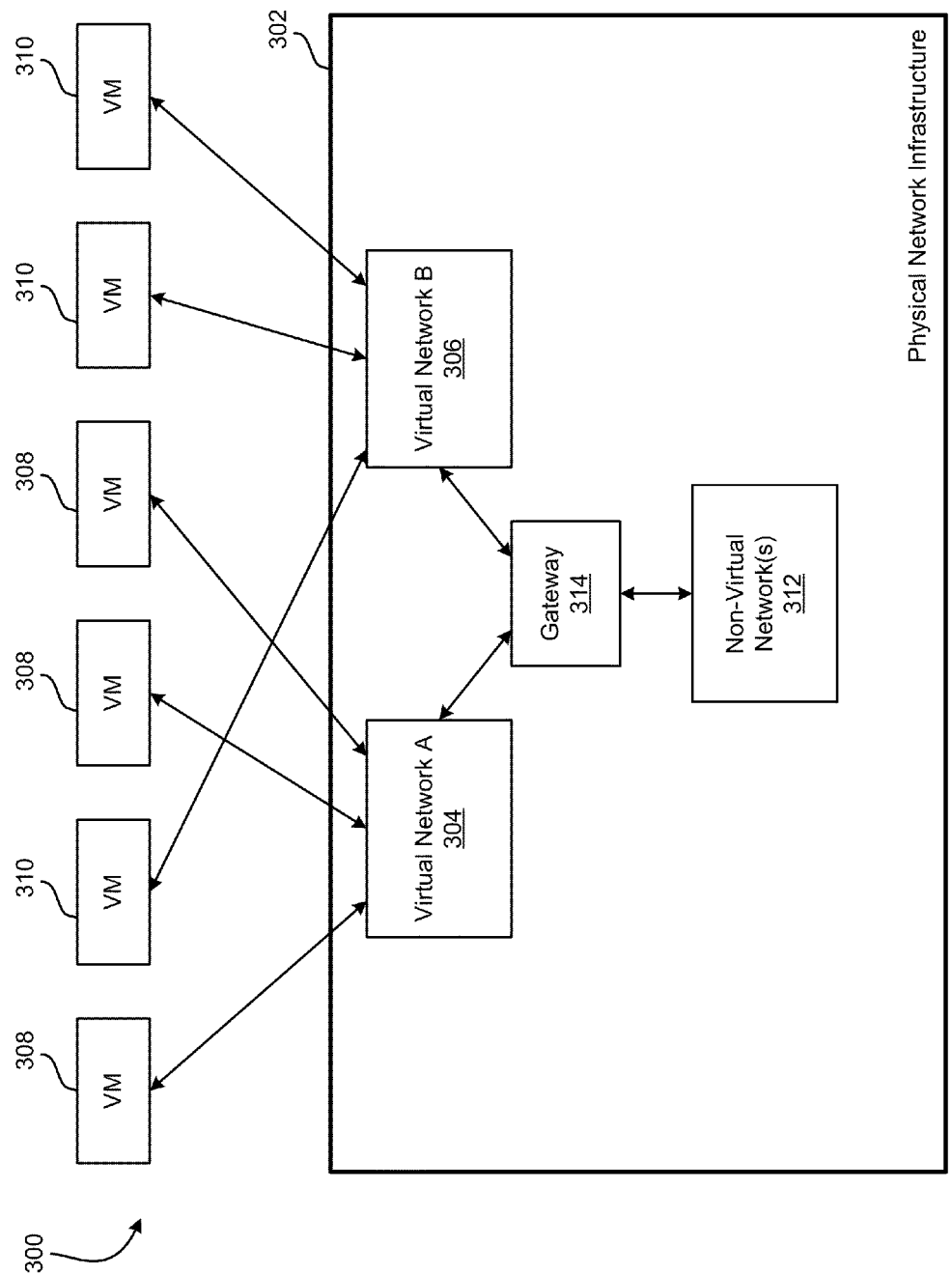
FIG. 3 is a simplified diagram of a virtualized data center, according to one embodiment.

Referring now to FIG. 3, a conceptual view of an overlay network 300 is shown according to one embodiment. The overlay network may utilize any overlay technology, standard, or protocol, such as a Virtual eXtensible Local Area Network (VXLAN), Distributed Overlay Virtual Ethernet (DOVE), Network Virtualization using Generic Routing Encapsulation (NVGRE), etc.

In order to virtualize network services, other than simply providing a fabric communication path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may be utilized by any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if the architecture is similar to a large flat switch, in a very large Layer-2 (L2) domain, then the VMs are aided in their attempt to move data across the architecture.

Figure 4:
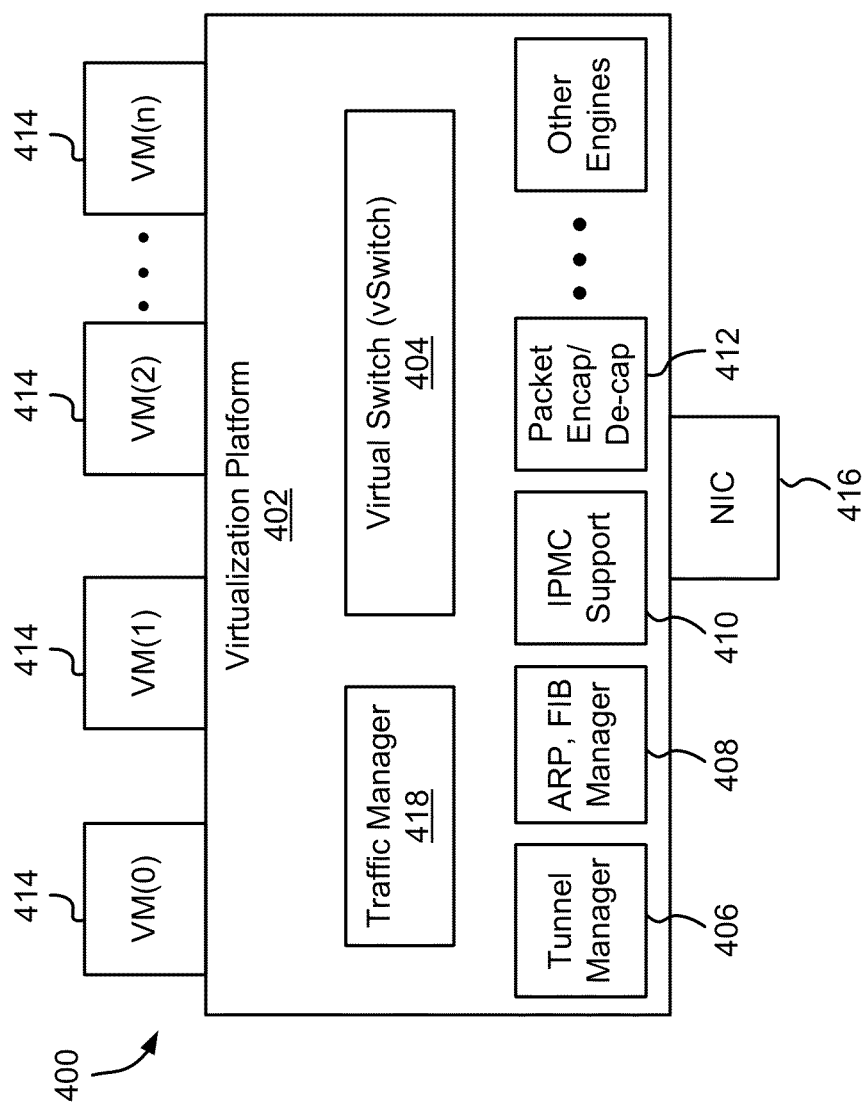
FIG. 4 shows a server, according to one embodiment.

With reference to FIG. 4, a server 400 is shown according to one embodiment. As shown, the server 400 includes a virtualization platform 402 which provides and manages a virtual switch (vSwitch) 404.

According to one embodiment, overlay functionality may be provided to the server 400. In order to accomplish this, the virtualization platform 402 may interact with a plurality of discrete software engines, such as a tunnel manager 406, an ARP and forwarding information base (FIB) manager 408, an engine for providing internet protocol multicast (IPMC) support 410, a packet encapsulation and de-capsulation engine 412, and any other overlay-enhancing software engines as known in the art. In another embodiment, these modules or software engines may be enacted on the NIC 416, or an overlay gateway connected via the NIC 416 to the server 400.

In one embodiment, the NIC 416 may be a hardware device or a virtual entity embodied as a virtual NIC (vNIC) capable of performing substantially the same functionality as the NIC 416, in various approaches. In another embodiment, the virtualization platform 402 or some other entity of the server 400 may be used to provide a vNIC, as would be understood by one of skill in the art.

The virtualization platform 402 also provides support for any number of VMs 414, shown in FIG. 4 as VM(0), VM(1), VM(2), . . . , VM(n). The VMs 414 may be arranged in one or more virtual networks (each virtual network may have a different virtual network identifier (VNID), such as VNID 1, VNID 2, VNID 3, etc. The number and arrangement of the VMs 414 in the exemplary virtual networks is not meant to be limiting on what configurations are possible, as the Figures only show exemplary arrangements of VMs 414 and virtual networks.

The server 400 may also include a traffic manager 418. Although the traffic manager 418 is shown as a separate module in the server 400, it may actually be a module, computer code, or function that is implemented by or executed by the virtualization platform 402, the vSwitch 404, the NIC 416, or any other suitable device within the server 400.

In one embodiment, the traffic manager 418 may comprise logic adapted to or may itself be adapted to allocate an available bandwidth for each link of a vSwitch 404 amongst one or more of a plurality of traffic classes, allocate an available bandwidth for each link of a vNIC amongst one or more of the plurality of traffic classes, and create identifiers for each of the traffic classes, as described in more detail later.

Figure 5:
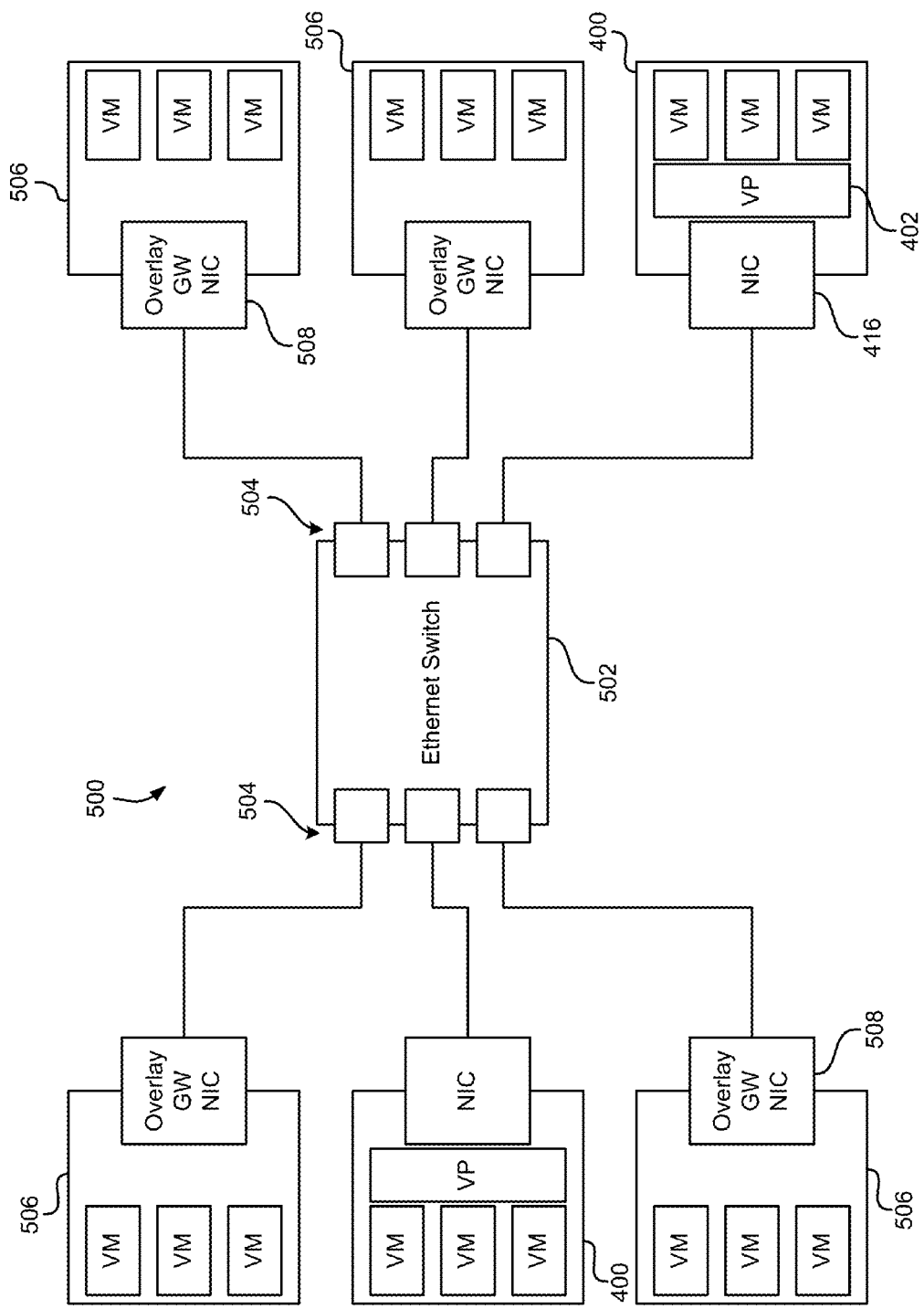
FIG. 5 shows a network, according to one embodiment.

In FIG. 5, a network 500 is shown according to one embodiment. As shown, servers 400 having contemporary NICs 416 and servers 506 having overlay gateway (GW) NICs 508 may be used in the same network 500. One or more Ethernet switches 502 may be used to interconnect the servers 400, 506 or the servers 400, 506 may be connected directly to one another. Each Ethernet switch 502 includes a plurality of ports 504 for connecting thereto. The contemporary NICs 416 may communicate via a virtualization platform (VP) 402 that may provide some overlay functionality, in other embodiments.

A software-defined overlay network is provided that has a common management framework for assignment of bandwidth to priorities, according to one embodiment. This software-defined overlay network may be implemented as an extension to any overlay network protocol, such as Distributed Overlay Virtual Ethernet (DOVE), VXLAN, NVGRE, etc., and may be used with existing virtualization platforms from any number of vendors, such as VMWare's ESX, IBM's PowerVM, KVM, Microsoft's Hyper-V, Xen, etc. The resulting virtualization platform vSwitch allows data to be organized into priority groups (also referred to as "traffic classes"), each of which is assigned a priority group identification (ID), such as a number, an alphanumeric string, etc. The priority grouping is created by and stored within a traffic manager. Furthermore, in some approaches, the priority grouping does not require a special frame format in order to be recognized by devices which are capable of implementing traffic priority handling.

In one embodiment, eight priority levels are proposed which coincide with a size of a PCP field within a VLAN tag already included in packet headers. A VLAN tag has 32 bits, and 3 bits are reserved for the PCP field to indicate priority, $2^3=8$ possible priority groups, implemented for each virtual port, e.g., on a per virtual port basis. This makes it possible to allocate different fractions of available link bandwidth to different traffic classes according to priority groupings. Some of the bandwidth on a switch physical layer may be allocated using other methods, while the remaining available bandwidth may be managed independently according to the embodiments disclosed herein.

According to one approach, traffic from different traffic classes may be provisioned for a specified or desired data rate, typically 10 Gbit/s, although any data rate may be used on a per switch, per port, or per traffic class basis. The bandwidth allocation quota may be implemented with a precision of around ±1%, provided that the processor hardware support for VM scheduling is available (such as from CPUs used by INTEL, IBM Power processors, etc.).

The vSwitch supports strict priority based scheduling for all traffic classes in some embodiments. This feature enables quality of service to be implemented based on any applicable application requirements. However, this may be prone to starving low-priority flows of bandwidth usage. Accordingly, any one traffic flow may be prevented from consuming all of the bandwidth of the link, which could otherwise result when a device sets all of its frames to the highest traffic priority level.

According to another embodiment, some fraction of the full link bandwidth may be reserved for lower priority traffic and may only be usable by lower priority traffic classes, in order to ensure that the full bandwidth of the link is not monopolized by higher priority traffic classes.

In a vSwitch, both Ethernet bandwidth allocation and computing or processing time slice allocation may be provided. When a vSwitch receives packets, it identifies highest priority packets and responds to the receipt of the packets by allocating its processing resources according to the traffic priorities. In contrast, a physical switch using ETS allocates physical resources, such as buffer space and execution levels, but not processing resources. A vSwitch does not have these resources, being implemented completely in software within a virtualization platform hosted by a server. Instead, the vSwitch achieves priority processing levels by assigning the highest priority packet processing to a higher priority task for processor thread execution, while a scheduler allocates available processor cycles accordingly. Thus, two levels of resource allocation are managed, one level is managed on the network bandwidth and the other resource is managed for vSwitch processor time slices.

Another embodiment allows for the ability to identify higher priority packets. These packets may be recognized by a NIC driver of the server hosting the vSwitch. The NIC driver then informs an intermediate virtualization platform kernel of the higher packet priority, which in turn informs the vSwitch.

In addition, in some approaches, the number of priority groups is calculated in advance and network bandwidth and processor time slices are assigned to these priority groups. For example, priority assignments may be different on a higher data rate NIC (100 Gbit/s or more) than on a lower data rate NIC, which is sharing different types of lower bandwidth traffic, or for applications such as Fiber Channel over Ethernet (FCoE) storage and/or Remote Direct Memory Access (RDMA) over Converged Ethernet (RoCE) clustering. When a higher priority packet arrives at the vSwitch, the virtualization platform kernel scheduler selects the process associated with that packet more often, and thus has enough processor time slices available for the higher priority task to execute.

There is a quota on processor time slice allocation, in some approaches. For example, only 20% of total CPU time slices may be available for vSwitch management, while the other 80% of the total CPU time slices is scheduled for different workloads not related to the vSwitch. In one approach, a thin scheduler may be provided to manage just the available 20% of the total CPU time slices. This thin scheduler may be a slave to the master scheduler, and may function under scheduling algorithms which may be server dependent. In some embodiments, the thin scheduler cannot request additional processor time slice allocation above its quota. Thus, priority scheduling is enforced from the server side of the network. In alternate embodiments, the thin scheduler may have the ability to request additional processor time slices when certain factors are present, such as a certain packet type needing to be sent, etc.

It is possible to combine up to eight (or more when the traffic class is denoted by an identifier which allows for more than eight different combinations) different traffic classes onto a single common link, according to one embodiment. Each of these traffic classes may be paused individually without interfering with the other traffic class packet handling. The bandwidth allocation function insures that separate channels do not compete for bandwidth, and also prevents bandwidth starvation for lower priority traffic.

In addition, a traffic class identifier which overrides the other available traffic classes may be provided, in some approaches. This ensures that applications or protocols which require an extremely high priority or very low latency—such as control and/or management traffic—will always be handled before any other received traffic. This override class may be used however a user chooses to use it, but the vSwitch may only apply the override process sparingly in order to ensure fair operation of the entire link.

The remaining traffic classes may be assigned a percentage of the total available processor time slices and network bandwidth. The bandwidth and processor time slice allocation assigned to a traffic class group is the minimum guaranteed bandwidth and processor time slice for that group, assuming high utilization of the link and minimal use of the override classification.

In addition, a traffic class group may take advantage of unused bandwidth and/or processor time slices available on the link whenever it is available. For example, if traffic class 1 has been allocated 60% of the network bandwidth or processor time slices, and traffic class 2 has been allocated 30%, it is possible for traffic class 1 to use up to 10% more bandwidth and processor resources than its allocated 60% (up to 70% total), provided that traffic class 2 does not require more than its allocated 30%. However, should both traffic classes (traffic class 1 and traffic class 2) request additional bandwidth and/or processor time slices, it may be divided up based on priority of the packets, priority of the traffic class, or some other characteristic, such as packet type, packet usage, link usage, etc.

Figure 6:
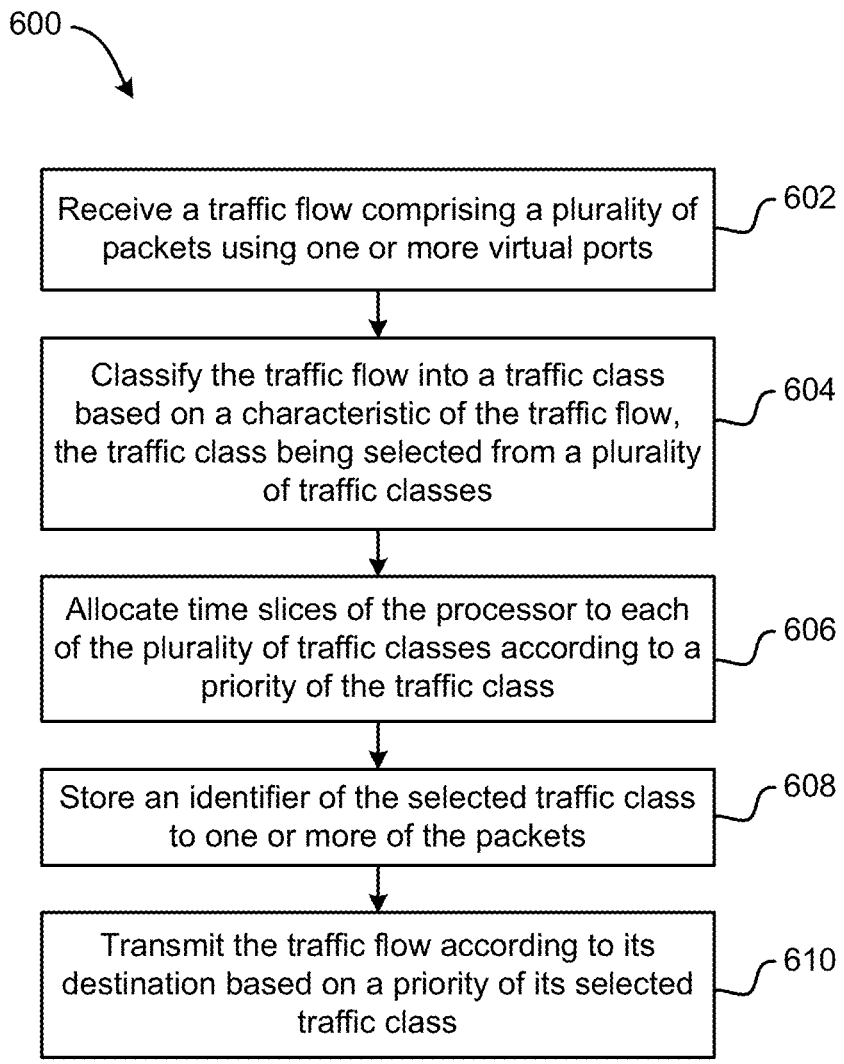
FIG. 6 shows a flowchart of a method according to one embodiment.

Now referring to FIG. 6, a flowchart of a method 600 for prioritizing traffic flow handling is shown, according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a vSwitch hosted by a server, a server, a processor (such as a CPU, an ASIC, an FPGA, etc.), a switch, a NIC, a vNIC, a virtualization platform, etc., or any other suitable device or component of a network system.

As shown in FIG. 6, method 600 may initiate with operation 602, where a traffic flow comprising a plurality of packets is received, such as by using one or more virtual ports of a vSwitch, a vNIC, etc.

In operation 604, the traffic flow is classified into a traffic class based on a characteristic of the traffic flow, the traffic class being selected from a plurality of traffic classes.

The characteristic of the traffic flow may include a priority of the traffic flow, a type of packets within the traffic flow (a type of traffic flow), a size of the packets within the traffic flow, an amount of packets within a traffic flow, etc. The characteristic of the traffic flow may be used to determine an amount of bandwidth which is available to transmit the traffic flow, with higher priority traffic flows being allocated proportionally more bandwidth than lower priority traffic flows.

In one approach, the characteristic may include a priority of the traffic flow (or any other characteristic known in the art which may denote priority. The priority of the traffic flow is then used to select a traffic class for the traffic flow. In this embodiment, the logic may be further adapted to determine an amount of bandwidth which is available to transmit the traffic flow based on a priority of the traffic class, with traffic flows from a traffic class having a higher priority being allocated proportionally more bandwidth than traffic flows from a traffic class having a lower priority.

In one embodiment, more than one characteristic may be used, such as by combining the priority of the traffic flow with a size of the traffic flow to select an appropriate traffic class with which to assign to the traffic flow.

In operation 606, computing time slices of the processor are allocated to each of the plurality of traffic classes according to a priority of the traffic class.

Any operation described in FIG. 6 may be performed by the vSwitch, a vNIC, a traffic manager, etc., according to various embodiments. For example, the traffic flow may be received using one or more virtual ports of a vSwitch or a vNIC.

In operation 608, an identifier of the selected traffic class is stored to one or more of the packets, such as in a VLAN identifier in a three bit PCP field in a VLAN tag portion of a header of the one or more packets.

In operation 610, the traffic flow is transmitted according to its destination based on the priority of its selected traffic class. In other words, traffic flows having a higher priority traffic class are assigned greater priority in their transmission (along with more processor time slices and a greater percentage of link bandwidth) than traffic flows having a lower priority traffic class.

In some approaches, the method 600 may further include receiving a request indicating a desired priority of a traffic flow, assigning the traffic flow to a traffic class corresponding to the desired priority, and charging a fee related to the desired priority for the traffic flow to a provider of the traffic flow.

In one embodiment, the identifier may be stored to headers of the packets in the traffic flow in a standard Ethernet frame format. In one specific embodiment, the identifier may be stored according to a VLAN identifier in a three bit priority code point (PCP) field in a VLAN tag portion of the headers of the packets.

In another embodiment, a server may include the system, the server comprising a virtualization platform providing a plurality of VMs, a vNIC adapted to provide network interface functionality, and the vSwitch adapted to provide virtual switching functionality. Additionally, the server may be adapted to operate within a software-defined overlay network.

Also, in some approaches, the plurality of traffic classes may be defined by a traffic manager. The traffic manager may be further adapted to create the plurality of traffic classes, each traffic class representing a priority of one or more Ethernet traffic flows, allocate an available bandwidth for each link (of a server, of a vSwitch, of a vNIC, etc.) amongst one or more of the plurality of traffic classes, and create identifiers for each of the traffic classes.

According to another embodiment, the method 600 may further include receiving another traffic flow (such as a second traffic flow comprising a plurality of second packets), determining a traffic class of the second traffic flow as an override traffic class, and providing highest priority to the second traffic flow. In this way, an override traffic class may be indicated which would allow a packet having such a designation to utilize the most expeditious route through the switch to egress through one of the ports.

The method 600 may be implemented in any system, computer program product, apparatus, etc., using any suitable operators, such as logic (hardware and/or software), modules, circuits, computer program code, etc.

In one such embodiment, a computer program product for prioritizing traffic flow handling comprises a computer readable storage medium having program code embodied therewith. The program code readable/executable by a processor to: receive, using the processor, a traffic flow comprising a plurality of packets; classify the traffic flow into a traffic class based on a characteristic of the traffic flow, the traffic class being selected from a plurality of traffic classes; store an identifier of the selected traffic class to one or more of the packets; and transmit the traffic flow according to its destination based on a priority of its selected traffic class.

In another such embodiment, a system comprises a hardware processor and logic integrated with and/or executable by the processor, the logic being adapted to: receive a traffic flow comprising a plurality of packets; classify the traffic flow into a traffic class based on a characteristic of the traffic flow, the traffic class being selected from a plurality of traffic classes; store an identifier of the selected traffic class to one or more of the packets; and transmit the traffic flow according to its destination based on a priority of its selected traffic class.

Any of the various other embodiments described in relation to FIG. 6 may be implemented in any of the systems, computer program products, apparatuses, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising a hardware processor and logic integrated with and/or executable by the hardware processor, the logic being configured to:
receive a traffic flow comprising a plurality of packets in a lossless Ethernet network;
classify the traffic flow into a traffic class based on a characteristic of the traffic flow, the traffic class being selected from a plurality of traffic classes;
allocate one or more computing time slices of the hardware processor to the traffic flow based on the selected traffic class;
store an identifier of the selected traffic class to one or more of the packets; and
transmit the traffic flow according to its destination based on a priority of the selected traffic class.

2. The system as recited in claim 1, wherein the logic is further configured to allocate computing time slices of the hardware processor to each of the plurality of traffic classes according to a priority of the traffic class.

3. The system as recited in claim 1, wherein the characteristic is selected from the group consisting of: a packet type, packet usage, and link usage, and wherein the traffic flow is received using one or more virtual ports of a virtual switch (vSwitch) or a virtual network interface card (vNIC).

4. The system as recited in claim 1, wherein the characteristic comprises a priority of the traffic flow, wherein the priority of the traffic flow is used to select a traffic class for the traffic flow, and wherein the logic is further configured to determine an amount of bandwidth which is available to transmit the traffic flow based on a priority of the traffic class, with traffic flows from a traffic class having a higher priority being allocated proportionally more bandwidth than traffic flows from a traffic class having a lower priority.

5. The system as recited in claim 1, wherein the logic is further configured to:
   receive a request indicating a desired priority of a traffic flow;
   assign the traffic flow to a traffic class corresponding to the desired priority; and
   charge a monetary fee related to the desired priority for the traffic flow to a provider of the traffic flow.

6. The system as recited in claim 1, wherein the identifier is stored to headers of the packets in the traffic flow in a standard Ethernet frame format.

7. The system as recited in claim 6, wherein the identifier is stored according to a virtual local area network (VLAN) identifier in a three bit priority code point (PCP) field in a VLAN tag portion of the headers of the packets.

8. The system as recited in claim 1, wherein a server comprises the system, the server comprising a virtualization platform providing:
   a plurality of virtual machines (VMs);
   a virtual network interface card (vNIC) configured to provide network interface functionality; and
   a virtual switch (vSwitch) configured to provide virtual switching functionality,
   wherein the server is configured to operate within a software-defined overlay network.

9. The system as recited in claim 1, wherein the plurality of traffic classes are defined by a traffic manager.

10. The system as recited in claim 9, wherein the traffic manager is configured to:
    allocate an available bandwidth for each link of a virtual switch (vSwitch) amongst one or more of the plurality of traffic classes;
    allocate an available bandwidth for each link of a virtual network interface card (vNIC) amongst one or more of the plurality of traffic classes; and
    create identifiers for each of the traffic classes.

11. The system as recited in claim 10, wherein up to eight traffic classes are created, and wherein the identifiers are three bits in length and stored to a virtual local area network (VLAN) identifier in a three bit priority code point (PCP) field in a VLAN tag portion of headers of the packets.

12. The system as recited in claim 1, wherein the logic is further configured to:
    receive a second traffic flow;
    determine a traffic class of the second traffic flow as an override traffic class; and
    provide highest priority to the second traffic flow.

13. A computer program product for prioritizing traffic flow handling, the computer program product comprising a computer readable hardware storage device having program code embodied therewith, the embodied program code readable/executable by a processor to:
    receive, using the processor, a traffic flow comprising a plurality of packets;
    receive, using the processor, a request indicating a desired priority of the traffic flow;
    classify, using the processor, the traffic flow into a traffic class based on the desired priority and a characteristic of the traffic flow, the traffic class being selected from a plurality of traffic classes, wherein the selected traffic class corresponds with the desired priority;
    store, using the processor, an identifier of the selected traffic class to one or more of the packets; and
    transmit, using the processor, the traffic flow according to its destination based on the desired priority.

14. The computer program product as recited in claim 13, wherein the embodied program code is further readable/executable by the processor to allocate, using the processor, computing time slices of the processor to each of the plurality of traffic classes according to a priority of the traffic class.

15. The computer program product as recited in claim 13, wherein the traffic flow is received in a lossless Ethernet network using one or more virtual ports of a virtual switch (vSwitch) or a virtual network interface card (vNIC).

16. The computer program product as recited in claim 13, wherein the characteristic is selected from the group consisting of: a packet type, packet usage, link usage, and a priority of the traffic flow, and wherein the embodied program code is further readable/executable by the processor to determine, using the processor, an amount of bandwidth which is available to transmit the traffic flow based on a priority of its selected traffic class, with traffic flows from a traffic class having a higher priority being allocated proportionally more bandwidth than traffic flows from a traffic class having a lower priority.

17. The computer program product as recited in claim 13, wherein the embodied program code is further readable/executable by the processor to:
    charge, using the processor, a provider of the traffic flow a monetary fee related to the desired priority for the traffic flow.

18. The computer program product as recited in claim 13, wherein the identifier is stored to headers of the packets in a standard Ethernet frame format in a virtual local area network (VLAN) identifier in a three bit priority code point (PCP) field in a VLAN tag portion of headers of the packets.

19. The computer program product as recited in claim 13, wherein the embodied program code is further readable/executable by the processor to:
    create, using the processor, the plurality of traffic classes, each traffic class representing a priority of one or more Ethernet traffic flows;
    allocate, using the processor, an available bandwidth for each link amongst one or more of the plurality of traffic classes;
    allocate, using the processor, an available bandwidth for each link of a virtual network interface card (vNIC) amongst one or more of the plurality of traffic classes; and
    create, using the processor, identifiers for each of the traffic classes.

20. The computer program product as recited in claim 13, wherein the embodied program code is further readable/executable by the processor to:
    receive, using the processor, a second traffic flow;
    determine, using the processor, a traffic class of the second traffic flow as an override traffic class; and
    provide, using the processor, highest priority to the second traffic flow.

21. A method for prioritizing traffic flow handling, the method comprising:
    receiving a traffic flow comprising a plurality of packets using one or more virtual ports of a virtual switch (vSwitch);

classifying the traffic flow into a traffic class based on a characteristic of the traffic flow, the traffic class being selected from a plurality of traffic classes, wherein the characteristic comprises a priority of the traffic flow, and wherein the priority of the traffic flow is used to select a traffic class for the traffic flow;

determining an amount of bandwidth which is available to transmit the traffic flow based on a priority of its selected traffic class, with traffic flows from a traffic class having a higher priority being allocated proportionally more bandwidth than traffic flows from a traffic class having a lower priority;

allocating computing time slices of a processor to each of the plurality of traffic classes according to a priority of the traffic class;

storing an identifier of the selected traffic class to one or more of the packets in a virtual local area network (VLAN) identifier in a three bit priority code point (PCP) field in a VLAN tag portion of a header of the one or more packets; and transmitting the traffic flow according to its destination based on the priority of its selected traffic class.

22. The method as recited in claim 21, further comprising:

receiving a request indicating a desired priority of a traffic flow;

assigning the traffic flow to a traffic class corresponding to the desired priority; and charging a fee related to the desired priority for the traffic flow to a provider of the traffic flow.

\* \* \* \* \*